United States Patent [19]

Pedu

[11] Patent Number: 4,681,197
[45] Date of Patent: Jul. 21, 1987

[54] ELECTROMAGNETIC CLUTCHES AND BRAKES

[75] Inventor: Jeffrey C. Pedu, Lake Placid, N.Y.

[73] Assignee: Placid Industries, Inc., Lake Placid, N.Y.

[21] Appl. No.: 652,345

[22] Filed: Sep. 19, 1984

[51] Int. Cl.$^4$ ............................................. F16D 37/02
[52] U.S. Cl. ................................................. 192/21.5
[58] Field of Search .................. 192/21.5, 12 D, 18 B, 192/84 T, 84 E; 188/267, 290

[56] References Cited

U.S. PATENT DOCUMENTS

| | | | |
|---|---|---|---|
| 2,709,928 | 6/1955 | Jones | 192/21.5 X |
| 2,872,001 | 2/1959 | Feiertag et al. | 192/21.5 |
| 2,903,110 | 9/1959 | Moody | 192/21.5 |
| 3,366,903 | 1/1968 | Searle et al. | 188/267 |
| 3,394,783 | 7/1968 | Searle | 192/21.5 |
| 3,415,346 | 12/1968 | Boeskool et al. | 192/21.5 |
| 3,439,787 | 4/1969 | Minciotti et al. | 192/21.5 |
| 3,672,476 | 6/1972 | Hendershot | 192/21.5 |
| 4,492,541 | 1/1985 | Herrero et al. | 188/290 X |

FOREIGN PATENT DOCUMENTS 0101134  6/1982  Japan .

Primary Examiner—George H. Krizmanich
Attorney, Agent, or Firm—Schiller, Pandiscio & Kusmer

[57] ABSTRACT

A magnetic particle clutch or brake structure is provided having a magnetic coupling element comprising a disk and at least one cup formed as an annular and coaxial peripheral flange at the periphery of the disk. The coupling element is mounted between two pole pieces, and a single electromagnetic energizing coil unit is provided which is arranged so as to cause the magnetic flux to pass through the disk and cup in series. The pole pieces are coupled together by an arrangement of magnetic and non-magnetic elements so as to provide for efficient direction of the magnetic flux in the manner contemplated by the invention. The invention is susceptible of being modified by having two cups attached to the same disk.

19 Claims, 4 Drawing Figures

ELECTROMAGNETIC CLUTCHES AND BRAKES

This invention pertains to electromagnetic clutches and brakes and more particularly to improvements in clutches and brakes which employ magnetic particles as a coupling agent.

PRIOR ART DEVICES

Electromagnetic particle clutches and brakes are well known and are illustrated, for example, by U.S. Pat. Nos. 3,450,238, 3,672,476, 3,216,542, 2,573,065, 2,685,947, 3,208,567, 3,394,784, 3,358,798 and 3,620,335.

The foregoing patents exemplify two types of magnetic particle clutches and brakes: (a) clutches and brakes that comprise a magnetic disk disposed between a pair of magnetic pole pieces, with magnetic particles disposed in the spaces between the disk and pole pieces, and (b) clutches and brakes that have a cylindrical magnetic cup or "basket" disposed between a pair of coaxial and concentric magnetic pole pieces or armatures, with magnetic particles disposed in the gaps between the cup or basket and the two pole pieces. By way of example, disk type magnetic particle clutches and brakes are illustrated by U.S. Pat. Nos. 2,573,065, 3,620,335, and 3,394,784. Clutches and brakes having cylindrical cups or baskets are exemplified by U.S. Pat. Nos. 2,573,065 (FIG. 2), 3,450,238 and 3,672,476.

Magnetic clutches and brakes have been known which include both disks and cups or baskets, but such arrangements have generally required different energizing circuits for the disk and cup or basket members. Such an arrangement is exemplified by U.S. Pat. No. 3,672,476.

OBJECTS AND SUMMARY OF THE INVENTION

The primary object of this invention is to provide an improved magnetic particle clutch or brake in which a cylindrical magnetic cup is formed integral with or attached to a magnetic disk, and a magnetic circuit is established whereby resultant magnetic flux passes through the cup and disk in series.

A further object of the invention is to provide a new and improved form of magnetic particle clutch or brake which exhibits increased torque per your unit of power applied to energize the clutch or brake.

A further specific object of the invention is to provide an improved clutch or brake having improved heat dissipation in comparison to conventional magnetic particle clutches and brakes, typically a 100% to 200% improvement in heat dissipation.

A further object of the invention is to improve upon the performance of magnetic particle clutches and brakes without having to increase their effective diameters.

These and other objects are achieved by providing a magnetic clutch or brake structure having a magnetic coupling element comprising a disk and at least one cup formed as an annular and coaxial flange formed at the periphery of the disk. The flange may be formed integral with the disk or may be formed as a separate element and then attached to the disk. The coupling element is mounted between two pole pieces, and an electromagnetic energizing circuit is provided which is arranged so as to cause the magnetic flux to pass through the disk and cup in series. The pole pieces are coupled together by a arrangement of magnetic and nonmagnetic elements so as to direct the magnetic flux in the manner contemplated by the invention. The invention is susceptible of being modified by having two cups attached to the same disk. Other features and many of the attendant advantages of the invention are set forth in the following detailed description which is to be considered together with the accompanying drawings:

THE DRAWINGS

Figure 1:
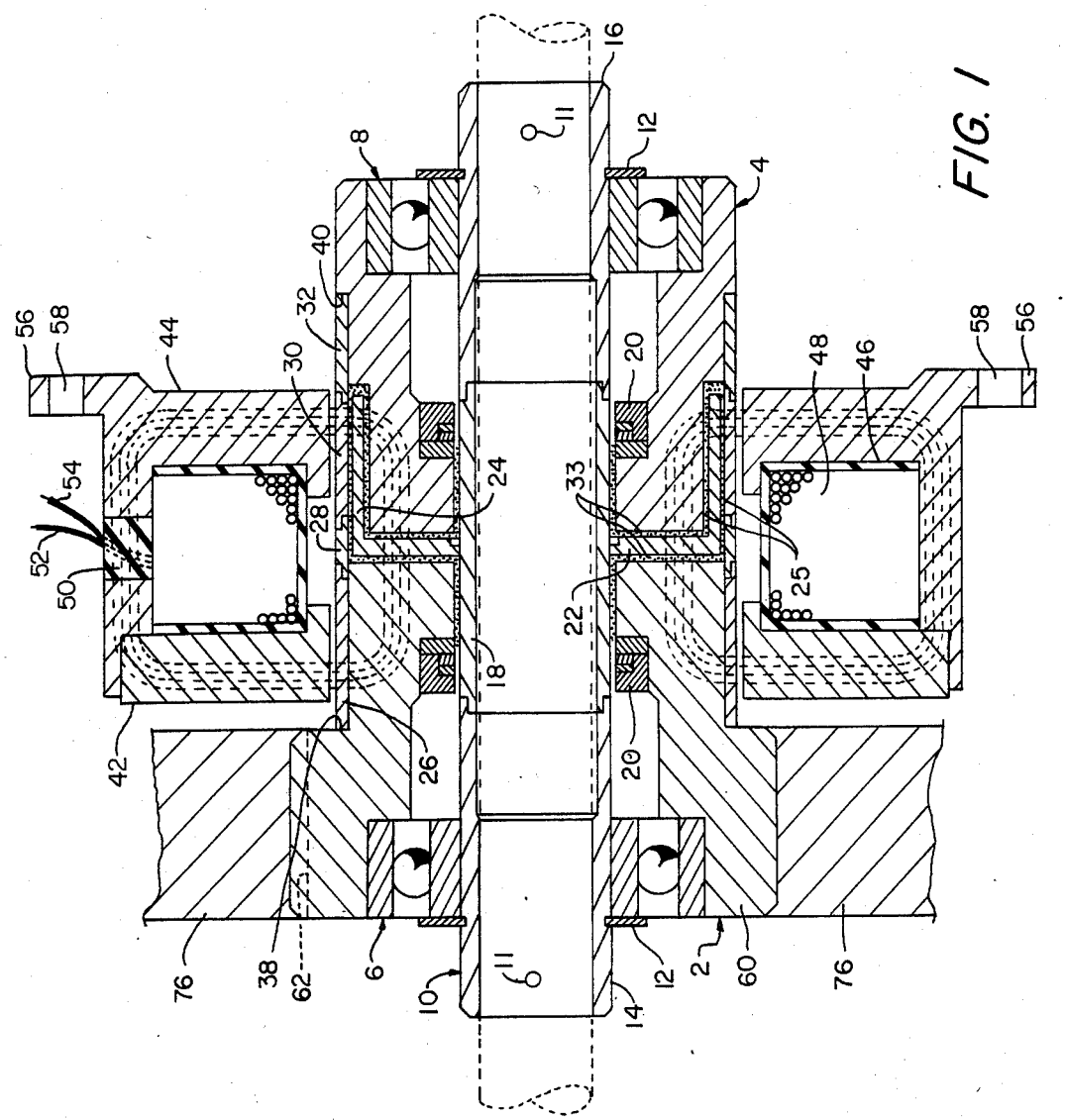
FIG. 1 is a longitudinal sectional view of a preferred embodiment of the invention comprising a single disk and cup.
Figure 2:
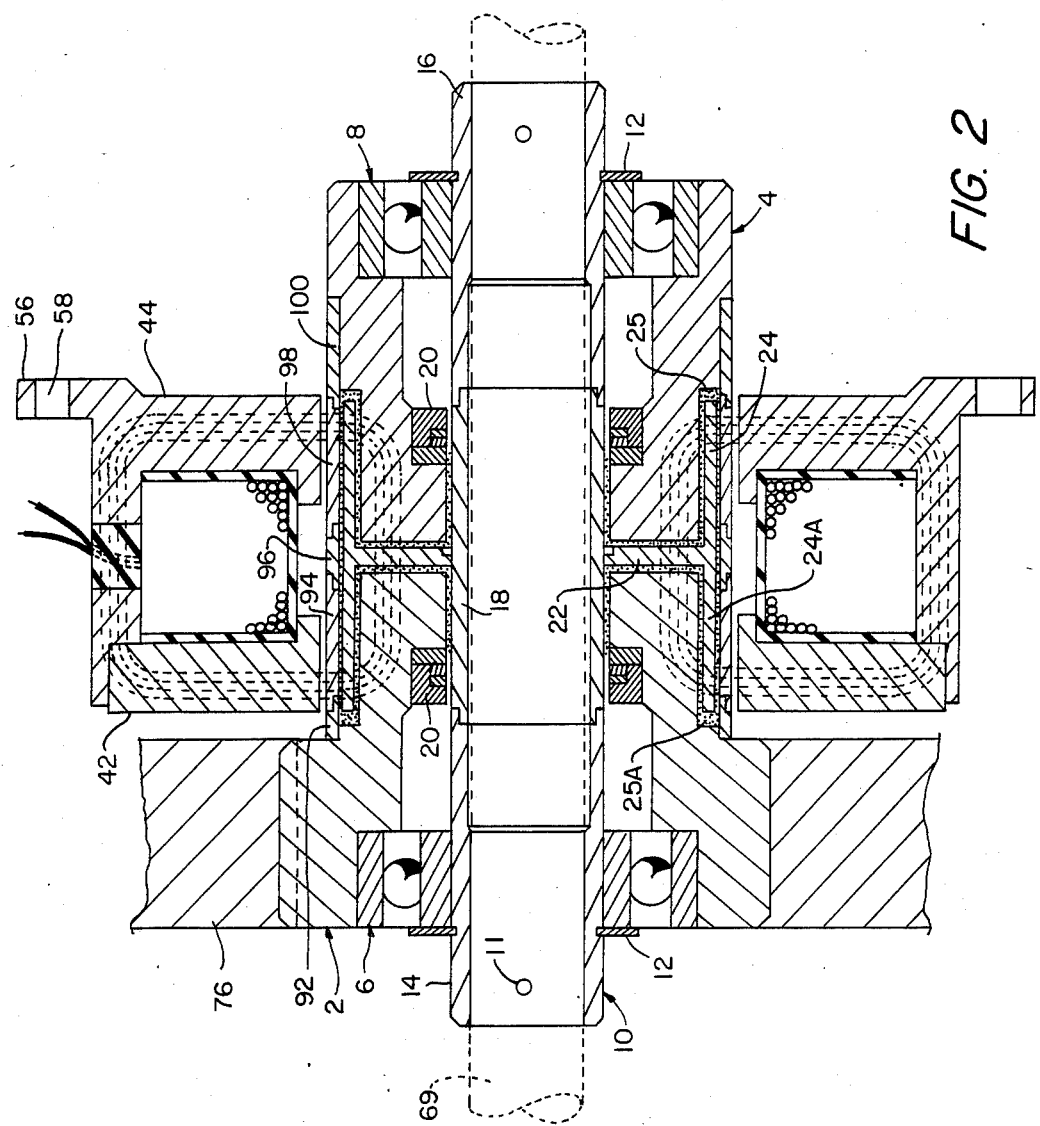
FIG. 2 is a longitudinal sectional view showing an alternative modification of the invention comprising a signle disk with two cups attached to the disk.
Figure 3:
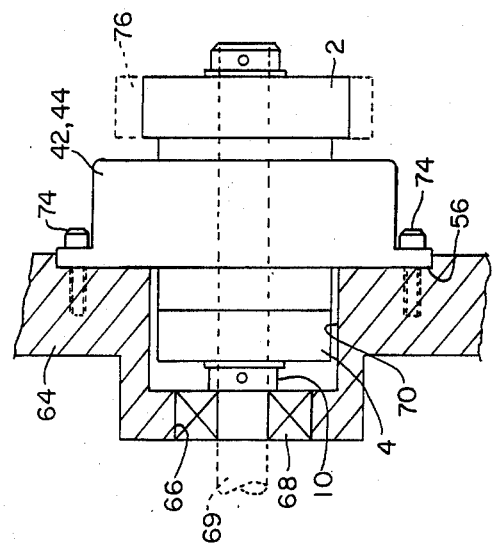

FIG. 3 schematically illustrates how the arrangement of FIG. 1 or 2 may be mounted to form a clutch.

Figure 4:
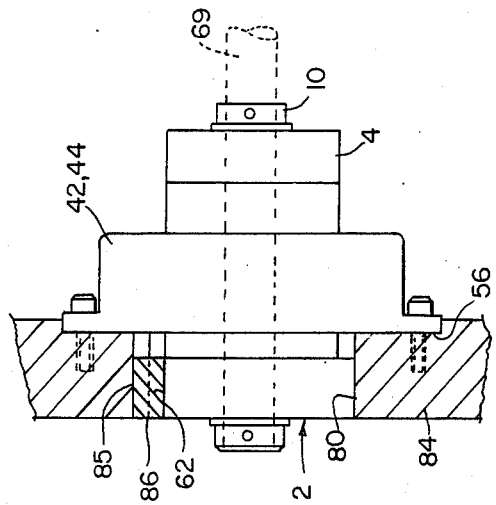

FIG. 4 is a partial side elevation illustrating how the arrangement of FIG. 1 or 2 may be mounted to form a brake.

In the drawings, like numerals designate like parts.

DETAILED DESCRIPTION OF THE INVENTION

Referring now to FIG. 1, the illustrated apparatus comprises two hollow magnetic pole pieces or armature members 2 and 4 of circular cross-section which are counterbored at their opposite ends to accept bearings 6 and 8 for mounting the pole pieces to a hollow shaft 10. Two snap rings 12 received by grooves in the shaft act against the inner races of the two bearings to hold the bearings tight in the counterbores.

The two pole pieces are coupled together by a cylindrical assembly consisting of four cylindrical connector or spacer elements in the form of sleeves 26, 28, 30 and 32 which are brazed or welded together. The sleeves 26 and 30 are made of a magnetic material, e.g. steel. The sleeves 28 and 32 are made of a non-magnetic material, e.g. aluminum or type 303 stainless steel. Sleeves 26 and 32 are secured to the two pole pieces in a suitable way, preferably by a press fit, and engage shoulders 38 and 40 on the pole pieces. The sleeves 26, 28, 30 and 32 function to maintain the two pole pieces separated from one another so as to form an annular gap 33.

Shaft 10 may be one piece, but preferably it consists of three sections, two end sections 14 and 16 and a center section 18. Preferably shaft 10 is made of non-magnetic material. Shaft 10 is hollow so as to permit it to accept a second shaft which typically functions as an output shaft in the case of a clutch or as the input brake shaft in the case of a brake. Preferably the opposite ends of shaft 10 have holes 11 for accomodating set screws or roll pins that function to secure it to the second shaft.

Affixed to shaft 10 is a disk 22 made of magnetic material. Disk 22 extends radially from the shaft and has an annular flange or lip 24 at its periphery which functions as a cup or basket-type coupling element. Flange 24 is made of the same material as disk 22 and may be formed as an integral part of the disk or may be separately formed and secured to the disk by any suitable means, e.g., brazing or welding. Disc 22 extends into the annular gap 33 and is positioned so that it is substantially equidistant from the confronting faces of the two pole pieces. Flange 24 extends into a peripheral groove 25 formed in the outer surface of pole piece 4 and is sized so that it is spaced radially from the pole piece and sleeves 28, 30 and 32. Sleeve 26 is spaced axially from flange 24 and is spaced radially from the axis of rotation of shaft 10 the same distance sleeves 28, 30 and 32 are spaced radially from the axis of rotation of shaft 10. A supply of particles of a magnetic material is disposed in gap 33 and groove 25 on opposite sides of disk 22 and flange 24. In FIGS. 1 and 2 the magnetic particles are represented by stipling. A pair of seals 20 of suitable design are disposed in grooves in the two pole pieces. The seals are designed to prevent escape of magnetic powder from gap 33 between the two pole pieces.

Surrounding the two pole pieces is an electromagnetic energizing assembly in the form of two ring-like iron stator members 42 and 44 which are secured together and are shaped so as define an annular groove of rectangular or square cross-section in which is disposed a coil assembly in the form of an insulating reel 46 of U-shaped cross section and a coil 48 disposed in the circular groove formed by the cylindrical center section and the annular said esections of the reel. Stator member 44 has a radial opening in which is received a hollow insulating plug 50 that secures the two leads or ends 52 and 54 of coil 48. The two leads are brought out of the stator assembly as shown for connection to an exterior energizing power supply. Stator member 44 also has a radially-extending peripheral flange 56 having a plurality of holes 58 whereby it may be attached to a suitable support.

The foregoing structure is arranged and adapted so as to permit it to function as a clutch, in which case the two pole pieces are allowed to rotate relative to the stator assembly, or as a brake, in which case the two pole pieces are fixed against rotation relative to the stator assembly. In this connection it is to be noted that pole piece 2 has an enlarged end section 60 that is provided with a keyway 62.

FIG. 3 illustrates how the construction of FIG. 1 may be mounted so as to form a clutch. It is to be appreciated that in the case of a clutch, the pole pieces 2 and 4 function as rotors. A housing 64 having an axial bore 66 is provided with a suitable roller or ball bearing unit 68. The inner race of bearing unit 68 receives a shaft 69 which extends within and is secured to shaft 10. Pole piece 4 resides rotatably in a counterbore 70 in the housing, and flange 56 is attached to the housing by means of a plurality of screws 74. An input gear or pulley 76 is attached to the pole piece 2 by means of a suitable key (not shown) which is inserted in keyway 62.

With the arrangement shown in FIG. 3, rotation of pole piece 2 by application of a driving force to gear or pulley 76 will cause pole piece 4 to rotate by virtue of the connection formed by the sleeve assembly 26, 28, 30 and 32. So long as coil 48 is deenergized, shaft 69 will remain stationary as the rotor assembly (i.e., pole pieces 2 and 4 and coupling sleeves 26, 28, 30 and 32) rotates. However, if the coil is appropriately energized, the flux of the electromagnetic field generated by energization of the coil wil be directed by stator sections 42 and 44, coupling sleeves 26, 28, 30 and 32 and pole pieces 2 and 4 so as to pass serially from stator 42 through rotor 2, through the magnetic particles in gap 33 between rotor 2 and disk 22, through disk 22, through the magnetic particles in gap 33 between disk 22 and pole piece 4, through pole piece 4 and the magnetic particles in the annular groove 25 between pole piece 4 flange 24, through flange 24, through the magnetic particles in groove 25 between flange 24 and magnetic sleeve 30, through stator 44, and back to stator 42. The applied electromagnetic field will cause (a) the magnetic particles in gap 33 to magnetically couple disk 22 with pole pieces 2 and 4, and (b) the magnetic particles in groove 25 to magnetically couple flange 24 to pole piece 4 and magnetic sleeve 30, whereby the disk/flange assembly 22,24 will rotate with pole pieces 2 and 4.

It is to be noted that the sleeve-like coupling assembly is arranged so that (a) magnetic sleeve 26 is aligned with stator element 42 and pole piece 2, (b) magnetic sleeve 30 is aligned with stator element 44, pole piece 4 and flange 24, (c) non-magnetic sleeve 28 is aligned with disk 22, and (d) non-magnetic sleeve 32 is aligned with pole piece 4. Thus sleeves 26 and 30 aid the magnetic flux path by directing it through the two pole pieces, non-magnetic sleeve 28 serves to prevent short circuiting of the magnetic flux path, and non-magnetic sleeve 32 functions to confine the flux to the portion of the rotor which is adjacent to the flange 24 and disk 22.

FIG. 4 shows how the arrangement of FIG. 1 may be mounted so as to function as a brake. In this case flange 56 is formed at the opposite end of stator 44 and pole piece 2 is inserted in a hole 80 in a housing or frame 84. Housing 84 is provided with a radially extending slot 85 intersecting hole 80 to receive a key 86 that mates with keyway 62 in pole piece 2, whereby pole piece 2, and thereby pole piece 4 and coupling sleeves 26, 28, 30 and 32, are locked to the housing. A second shaft 69 is mounted within and is secured to hollow shaft 10. Shaft 69 is connected to mechanical means (not shown) which are to be braked by operation of the brake assembly. Since pole piece 2 is secured to frame 84. energization of coil 48 (FIG. 1) will cause (a) the magnetic particles in gap 33 to magnetically couple disk 22 to pole pieces 2 and 4, and (b) the magnetic particles in groove 25 to magnetically couple flange 24 to pole piece 4 and magnetic sleeve 30, with the result that the shaft 69 will be locked against rotation if already stopped or will be caused to stop if it is rotating.

FIG. 2 illustrates a modification of the invention. The structure shown in FIG. 2 is virtually identical to the structure shown in FIG. 1 except that pole piece 2 has a peripheral groove 25A, and the disk 22 has a second flange 24A that extends oppositely to flange 24 and resides in groove 25A. Additionally, the coupling assembly connecting the pole pieces is formed of five different elements, three non-magnetic sleeves 92, 96 and 100 and two magnetic sleeves 94 and 98. The sleeves may be connected together by a press fit or by other suitable means such as brazing or welding.

The embodiment shown in FIG. 2 functions virtually identically to the embodiment shown in FIG. 1 except that additionally the flux path now extends through the second flange 24A. Sleeves 92, 96 and 100 function to limit the path of the magnetic flux generated by energization of coil 48 and sleeves 94 and 98 function to direct the flux path through the two flanges 24 and 24 A and disk 22. The embodiment of FIG. 2 is more efficient, albeit more costly, than the embodiment of FIG. 1. Obviously the embodiment of FIG. 2 may be used in arrangments such as are exemplified in FIGS. 3 and 4.

ADVANTAGES AND MODIFICATIONS OF THE INVENTION

It is believed clear that the present invention provides a distinct advantage over those magnetic particle clutches and brakes that constitute the prior art in that it utilizes a single eletromagnetic energizing coil to electromagnetically couple at least one disk element and at leas one cup element to two pole pieces, so as to effectively produce an improved clutch or brake (depending on how the pole pieces are mounted).

A further advantage of the invention is that because the magnetic flux path passes through both disk and cup elements, the torque characteristic of the device is increased substantially, typically about 100% over a typical single disk or single cup design.

Still another advantage is that heat dissipation is increased due to the fact that a surface area of the cup added to that of the disk area is substantial. Typically, the cup will have an area equal to between about 100 or 200% of the area of the disk, whereby the heat dissipation of the device is increased proportionately.

An important consideration of the invention is that the gap between pole pieces 2 and 4 and disk 22, and also the gap(s) between the pole pieces(s) and the sleeve-like assembly which connects the two pole pieces, is quite small, typically being in the order of 0.010 inch. Larger gaps, and especially large gaps through which the primary flux field does not pass, tend to give rise to powder containment problems attendant to prior devices. In this connection it is to be noted that magnetic particle clutches and brakes are usually tested and calibrated for output after manufacture and before being shipped to customers. Commonly customers test the devices before using them to make certain that their operating characteristics conform to the manufacturer's certification. A large problem with clutches and brakes made according to prior designs is that frequently the customers tests show that they have operating characteristics different than those certified by the manufacturer. As a consequence, the customer may have to adjust the device to achieve the desired output or, if the device is not adjustable, the customer may have to return the device to the manufacturer for replacement. A primary cause of this change in operating characteristics is migration of magnetic particles from portions of the gap through which the flux field does not pass to portions of the gap through which the flux field passes (and vice versa), as a result of vibrations and/or shock incurred during shipment or use. During use when the coil is energized, powder is magnetically attracted from portions of the gap where the flux field is absent to portions of the gap when the flux field is present, causing the torque to increase. During use or shipment when the coil is de-energized, the powder migrates in the reverse direction, causing the torque to decrease. An advantage of clutches and brakes made according to this invention is that they do not undergo changes in operating characteristics during transit from the manufacturer to the customer or during use. This reliability of performance is due in part to having a gap spacing in the order of 0.010 inch as described above and in part of the fact that the invention comprises both a disk and at least one cup attached to the disk and a single operating coil assembly for producing a magnetic field whose flux passes through the disk and at least one cup in series, with the flux passing through all of the gaps containing magnetic powder.

Obviously the invention may be used in a large number of applications. Also whatever apparatus embodies the invention may be modified in various ways without departing from the essential features of the invention. Thus in clutches or brakes embodying the invention, the electromagnetic coil assembly may comprise more than one coil so as to permit variations in the amount of power applied to the clutch or brake. Similarly, the construction and disposition of the pole pieces, the coupling assembly, the shaft seals, and the bearings supporting the hollow shaft, may be varied in ways obvious to persons skilled in the art. Furthermore, shaft 10 need not be hollow for connection to a second shaft; instead it may be adapted to be connected to a second shaft in a manner other than as illustrated according to whether or not a clutch or brake assembly is involved and the particular installation in which the clutch or brake assembly is used. Still other possible modifications and uses of the invention will be obvious to persons skilled in the art of electromagnetic clutches and brakes.

What is claimed is:

1. A magnetic particle device comprising:
   first and second magnetic pole members;
   a shaft;
   means rotatably mounting said first and second pole members to said shaft;
   a disk connected to said shaft and extending into a first gap formed between confronting faces of said first and second pole members, said first and second faces being close to but space from said disk;
   at least one annular flange attached to said disk, said flange extending parallel to the axis of said shaft;
   a coupling assembly connecting said first and second pole members so that said first and second pole members and said coupling assembly form a unitary structure, and said coupling assembly comprising at least first and second non-magnetic sleeve members and a magnetic sleeve member connected to and extending between said first and second non-magnetic sleeve members;
   a groove in at least one of said pole members for accomodating said at least one annular flange, said at least one annular flange extending into said groove in radial spaced relation with said one pole member and said coupling assembly;
   particles of a magnetic material disposed in said first gap and said groove on both sides of said disk and said flange;
   means for establishing a magnetic field whose magnetic flux passes serially through said first pole member, said disk, said second pole member, and said at least one flange so as to magnetize said magnetic particles and transform said magnetic particles into a torque transmitting coupling between said pole members on the one hand and said disk and said flange on the other hand; and
   sealing means disposed between said shaft and said pole members for preventing escape of said particles of magnetic material from said first gap between said pole members.

2. A magnetic particle device as defined by claim 1 wherein each of said pole members has a groove for accomodating an annular flange, first and second flanges are attached to said disk and extend into said grooves away from said disk, with each of said flanges being in radial spaced relation with one of said pole members and said coupling assembly, and further wherein said coupling assembly comprises at least three non-magnetic sleeve elements and two magnetic sleeve elements disposed in alternating relation to one another and arranged to cooperate with said means for establishing a magnetic field so as to direct the magnetic flux of said magnetic field to pass serially through said first flange, said first pole member, said disk, said second pole member and said second flange.

3. A magnetic device according to claim 1 further including a frame support for nonrotably supporting said shaft.

4. A magnetic device according to claim 1 wherein at least one of said pole members is adapted to be mounted to a non-rotatable stationary support.

5. A magnetic particle device according to claim 3 wherein said frame support has at least one ear with hole for receiving a fastener whereby at least one ear may be secured to a stationary frame.

6. A magnetic particle device according to claim 1 wherein said means for establishing a magnetic field comprises first and second stator elements secured to one another and forming an annular chamber for containing an electric coil.

7. A magnet particle device comprising:
a housing;
an assembly within said housing comprising first and second axially spaced magnetic pole members;
a shaft rotatably supported within said assembly;
a disk affixed to said shaft extending radially between said pole members;
an annular flange affixed to said disk extending axially in close proximity to at least one of said pole members;
a coupling assembly connecting said pole members and disposed in radially spaced surrounding relation to said disk and flange;
magnetic particles disposed in the spaces between said disk and said flange on the one hand and said pole members on the other hand;
sealing means disposed between said shaft and said pole members so as to prevent escape of said particles from said spaces; and
means cooperating with said coupling assembly for establishing a magnetic field whose magnetic flux passes serially through said first pole member, said disk, said second pole member and said flange so as to lock said particles in a magnetic torque-transmitting relation with said pole members, said disk and said flange.

8. A magnetic particle device according to claim 7 wherein said coupling assembly comprises a pair of non-magnetic sleeves and a magnetic sleeve disposed between and connected to said non-magnetic sleeves, one of said non-magnetic sleeves being radially aligned with said disk and the other of said non-magnetic sleeves being attached to one of said pole members.

9. A magnetic particle device according to claim 7 comprising two annular flanges attached to the periphery of said disk and extending in opposite directions away from said disk, and further wherein said coupling assembly comprises three non-magnetic sleeves disposed in alternating relation with and connected to two magnetic sleeves, with the first and second ones of said non-magnetic sleeves being attached to said first and second pole members, respectively and the third one of said non-magnetic sleeves being radially aligned with said disk, and said two magnetic sleeves being radially aligned with said flanges, whereby said coupling assembly cooperates with said means for establishing a magnetic field so as to direct the magnetic flux of said magnetic field to pass serially through a first one of said two annular flanges, said first pole member, said disk, said second pole member, and a second one of said two annular flanges.

10. A magnetic particle device according to claim 9 wherein said coupling assembly is secured to said housing by virtue of a keyway means between one of said pole members and said housing for preventing said coupling assembly from rotating relative to said housing.

11. A magnetic particle device according to claim 10 wherein said first and second pole members are rotatably mounted to said housing.

12. A magnetic particle device according to claim 11 wherein said shaft is hollow and is adapted to receive a second shaft, and further wherein attachment means are formed in said shaft for use in coupling said shaft to said second shaft.

13. A magnetic particle device comprising:
first and second hollow magnetic pole members having axially aligned center holes and mutually confronting first and second end faces respectively, with a gap between said end faces;
a circumferentially-extending groove in a peripheral portion of said first pole member communicating with said gap;
a hollow cylindrical coupling assembly surrounding and secured to portions of said first and second pole members so as to maintain said pole members in fixed relation to one another with said gap therebetween, said coupling assembly comprising first and second magnetic sleeves aligned radially with said flange and said second pole member respectively and a non-magnetic sleeve disposed between and connected to said magnetic sleeves in radial alignment with said gap;
a shaft extending through said center holes;
first and second bearing members attached to said first and second pole members in coaxial relation with said center holes, said shaft being rotatably supported by said first and second bearing members;
a disk affixed to said shaft and extending radially into said gap between and in spaced relation to said first and second end faces;
a cylindrical flange affixed to said disk in coaxial relation with said shaft, said flange being disposed so as to extend into said groove in radially spaced relation with said coupling assembly and said first pole member;
magnetic particles disposed in said gap and said groove on opposite sides of said disk and said flange;
sealing means between said pole members and said shaft for preventing escape of particles from said gap; and
an electro-magnetic energizing assembly surrounding said pole members, said energizing assembly comprising a coil adapted to establish a magnetic field in response to an energizing electrical current, and magnetic means cooperating with said coil and said coupling assembly for directing the magnetic flux of said field so that said flux passes serially through said flange, said first pole member, said disk, said second pole member, and said second and first magnetic sleeves of said coupling assembly, with said magnetic particles being magnetized so as to magnetically clutch said disk and flange to said pole members.

14. A magnetic particle device according to claim 13 wherein said coupling assembly comprises first and second non-magnetic sleeves affixed to said first and second pole members respectively, a third non-magnetic sleeve disposed in radial alignment with said disk, and a magnetic sleeve being secured at one end to said first non-magnetic sleeve and at the other end to said third non-magnetic sleeve, said magnetic sleeve being in radial alignment with said groove and said sleeve.

15. A magnetic particle device according to claim 13 further comprising a second circumferentially-extending groove in a peripheral portion of said second pole member communicating with said gap, and a second flange attached to said disk, said second cylindrical flange extending oppositely into said second groove in radial spaced relation with said coupling assembly and said second pole member, and magnetic particles in said second groove on opposite sides of said second flange, said electromagnetic energizing assembly and said coupling assembly being adapted to cooperate with one another so as to direct the flux of said magnetic field through said second flange in series with said first flange, said first pole member, said disk, and said second pole member, whereby the magnetic particles in said gap and said first and second grooves are magnetized so as to magnetically clutch said disk and flanges to said first and second pole members.

16. A magnetic particle device according to claim 15 wherein said coupling assembly comprises first and second non-magnetic sleeves affixed to said first and second pole members respectively, a third non-magnetic sleeve disposed in radial alignment with said disk, a first magnetic sleeve secured at one end to said first non-magnetic sleeve and at the other end to said third non-magnetic sleeve, and a second magnetic sleeve secured at one end to said second non-magnetic sleeve and at the other end to said third non-magnetic sleeve, said first and second magnetic sleeves being in radial alignment with said first and second flanges respectively, whereby the magnetic flux of said magnetic field passes serially through said first magnetic sleeve, said first flange, said first pole member, said disk, said second pole member, said second flange, and said second magnetic sleeve.

17. A magnetic particle device according to claim 13 wherein said electro-magnetic energizing assembly is adapted to be secured to a fixed support.

18. A magnetic particle device according to claim 13 further including a hollow housing surrounding said first and second pole members, and means for securing said electro-magnetic energizing assembly to said housing.

19. A magnetic particle device according to claim 18 wherein said shaft is hollow, and further including a second shaft mounted within and secured to said first-mentioned shaft.

* * * * *

UNITED STATES PATENT AND TRADEMARK OFFICE
CERTIFICATE OF CORRECTION

PATENT NO. : 4681197

DATED : July 21, 1987

INVENTOR(S) : Jeffrey C. Pedu

It is certified that error appears in the above-identified patent and that said Letters Patent is hereby corrected as shown below:

Claim 1, column 6, line 22, the word "space" should be changed to -- spaced --.

Claim 3, column 7, line 2, the word "nonrotably" should be changed to -- nonrotatably --.

Claim 5, column 7, line 9, the word "a" should be inserted before the word -- hole --.

Signed and Sealed this

Twenty-fourth Day of November, 1987

Attest:

DONALD J. QUIGG

Attesting Officer

Commissioner of Patents and Trademarks